(12) United States Patent
Faians et al.

(10) Patent No.: US 9,620,123 B2
(45) Date of Patent: Apr. 11, 2017

(54) SEAMLESS AUTHENTICATION AND ENROLLMENT

(71) Applicant: NICE-SYSTEMS LTD., Ra'anana (IL)

(72) Inventors: Shahar Faians, Tel Aviv (IL); Avraham Lousky, Hod Hasharon (IL); Elad Hoffman, Tel Aviv (IL); Alon Moshe Sabban, Rishon le Zion (IL); Jade Tarni Kahn, Givat Shmuel (IL); Roie Mandler, Kfar-Saba (IL)

(73) Assignee: NICE LTD., Ra'anana (IL)

( * ) Notice: Subject to any disclaimer, the term of this patent is extended or adjusted under 35 U.S.C. 154(b) by 221 days.

(21) Appl. No.: 13/875,317

(22) Filed: May 2, 2013

(65) Prior Publication Data
US 2014/0330563 A1 Nov. 6, 2014

(51) Int. Cl.
*G10L 15/00* (2013.01)
*G10L 17/04* (2013.01)

(52) U.S. Cl.
CPC .................... *G10L 17/04* (2013.01)

(58) Field of Classification Search
CPC .... G06F 21/32; G06F 21/577; G06F 21/6245; G06F 21/64; G06F 2221/2101; G06Q 20/4016; G06Q 20/385; G06Q 20/40; G06Q 20/4014; G06Q 30/0248; H04L 2463/102; H04L 63/0861; H04L 63/102
USPC ...... 704/236, 9, 273, 246, 233, 231; 99/236; 726/26, 22; 713/185, 168; 705/44, 42, 35
See application file for complete search history.

(56) References Cited

U.S. PATENT DOCUMENTS

| | | | |
|---|---|---|---|
| 8,056,128 B1 * | 11/2011 | Dingle | G06F 17/2211 726/22 |
| 8,145,562 B2 | 3/2012 | Wasserblat et al. | |
| 8,225,413 B1 * | 7/2012 | De | G06F 21/316 726/22 |

(Continued)

OTHER PUBLICATIONS

"The Security Value of Voice Biometrics for IVRs and Call Centers" Nuance, Feb. 2013, Retrieved from http://www.nuance.com/ucmprod/groups/enterprise/@web-enus/documents/collateral/nc_028568.pdf on Sep. 18, 2014.

(Continued)

*Primary Examiner* — Michael Colucci
(74) *Attorney, Agent, or Firm* — Pearl Cohen Zedek Latzer Baratz LLP

(57) ABSTRACT

Some aspects of the invention may include a computer-implemented method for enrolling voice prints generated from audio streams, in a database. The method may include receiving an audio stream of a communication session and creating a preliminary association between the audio stream and an identity of a customer that has engaged in the communication session based on identification information. The method may further include determining a confidence level of the preliminary association based on authentication information related to the customer and if the confidence level is higher than a threshold, sending a request to compare the audio stream to a database of voice prints of known fraudsters. If the audio stream does not match any known fraudsters, sending a request to generate from the audio stream a current voice print associated with the customer and enrolling the voice print in a customer voice print database.

19 Claims, 9 Drawing Sheets

(56) References Cited

U.S. PATENT DOCUMENTS

| | | | | |
|---|---|---|---|---|
| 9,032,217 B1* | 5/2015 | Brandwine | ............ | G06F 21/44 713/185 |
| 2005/0097320 A1* | 5/2005 | Golan | ............ | G06F 21/40 713/166 |
| 2006/0090073 A1* | 4/2006 | Steinberg | ............ | G06F 21/31 713/170 |
| 2006/0106605 A1* | 5/2006 | Saunders | ............ | G10L 17/04 704/246 |
| 2006/0271457 A1* | 11/2006 | Romain | ............ | G06Q 20/04 705/35 |
| 2007/0177768 A1* | 8/2007 | Tsantes | ............ | G06Q 30/00 382/115 |
| 2008/0300877 A1* | 12/2008 | Gilbert | ............ | G06Q 40/00 704/246 |
| 2009/0055193 A1* | 2/2009 | Maislos | ............ | G06F 21/32 704/273 |
| 2009/0319270 A1* | 12/2009 | Gross | ............ | G10L 15/22 704/246 |
| 2010/0228656 A1* | 9/2010 | Wasserblat | ............ | G06Q 10/10 705/35 |
| 2011/0010543 A1* | 1/2011 | Schmidt | ............ | H04W 12/10 713/168 |
| 2011/0161076 A1* | 6/2011 | Davis | ............ | G06F 3/04842 704/231 |
| 2012/0284026 A1* | 11/2012 | Cardillo | ............ | G10L 17/08 704/246 |
| 2013/0232073 A1* | 9/2013 | Sheets | ............ | G06Q 20/40145 705/44 |
| 2014/0136194 A1* | 5/2014 | Warford | ............ | G10L 17/02 704/233 |
| 2014/0279486 A1* | 9/2014 | Kessler | ............ | G06Q 20/4016 705/42 |
| 2015/0095019 A1* | 4/2015 | de Zeeuw | ............ | G06F 17/2211 704/9 |

OTHER PUBLICATIONS

"Nuance Voice Biometrics: Improving the Caller Experience" Nuance, 2012, Retrieved from http://china.nuance.com/ucmprod/groups/enterprise/@web-enus/documents/collateral/nc_019968.pdf on Sep. 18, 2014.

\* cited by examiner

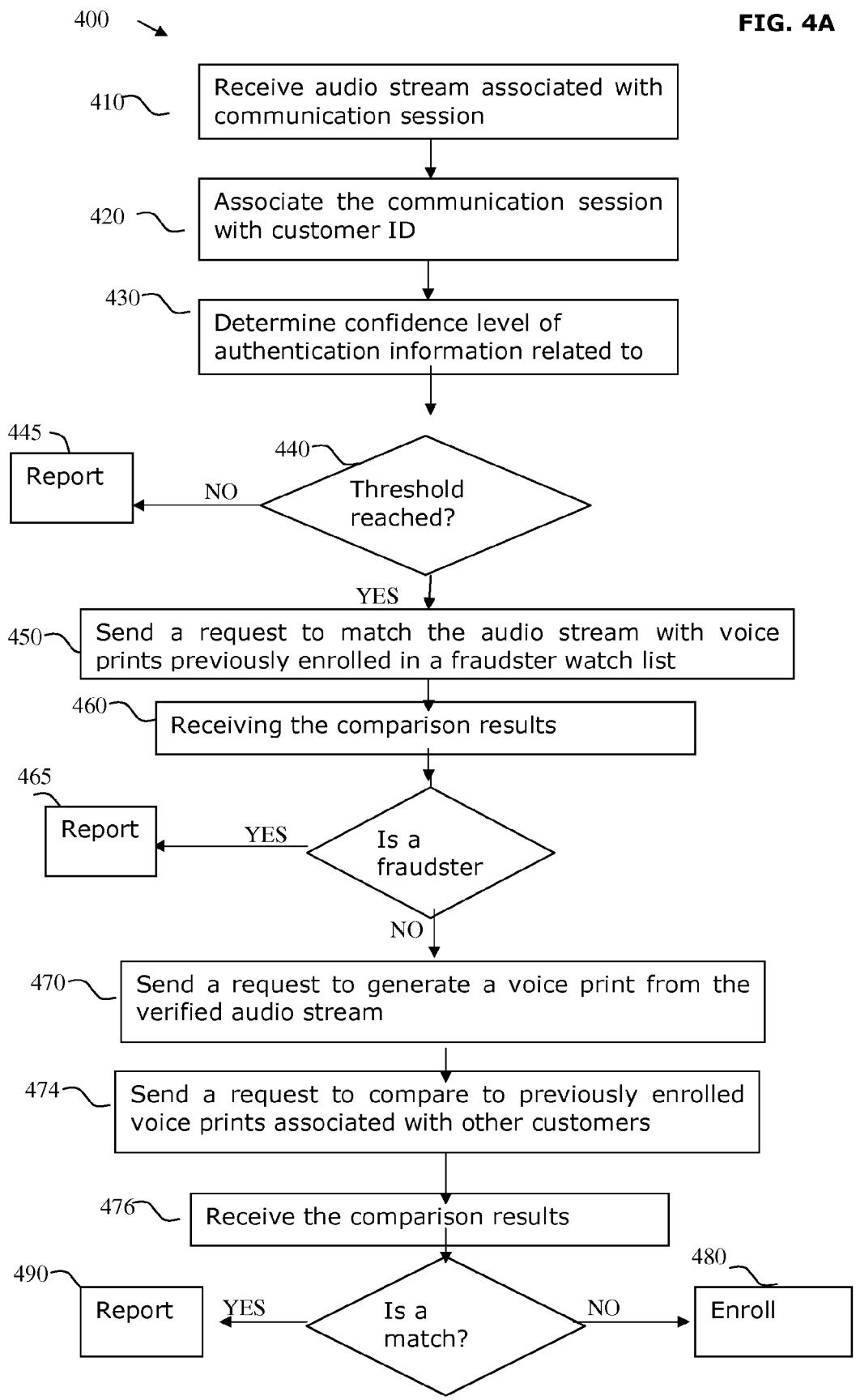

SEAMLESS AUTHENTICATION AND ENROLLMENT

Large organizations, such as commercial organizations, financial institutions, government agencies or public safety organizations conduct numerous interactions (i.e., communication sessions) with customers, users, suppliers and the like on a daily basis. Many of these interactions are vocal or at least comprise a vocal or audio component, for example, voices of parties to a telephone call or the audio portion of a video or a face-to-face interaction. A significant part of these interactions takes place between a customer and a representative of the organization, e.g., an agent in a contact center.

Communication sessions may involve exchanging sensitive information, for example, financial data, transactions and personal medical data, thus the agent is required to authenticate the identity of the customer, before offering the customer any assistance or services. When a communication session begins the system or an agent first identifies the customer, for example based on the customer's name, telephone number, ID number, Social Security number or Postal Index Number (PIN) code and later authenticates the identity of the customer. Traditional systems and methods use knowledge-based information also known as, Know Your Client (KYC) information, such as personal information known only to the client that was previously stored in the organization database (e.g., the name of your pet, your old school, the marriage data of your parents, etc). Some organizations use secret pass key(s) or even physical characteristics of the person, for example, finger prints and voice prints to authenticate the customer identity.

Voice prints or voice biometric data also known as spectrograms, spectral waterfalls, sonograms, or voicegrams, are time-varying spectral representations of sounds or voices. Digital voice prints may be created from any digital audio recording of voices, for example, audio recordings of communications sessions between agents and customers. A voice print can be generated by applying short-time Fourier transform (STFT) on various (preferably overlapping) audio streams of the audio recording (segment). A three-dimensional image of the voice print may present measurements of magnitude versus frequency for a specific moment in time. A speaker's voice is extremely difficult to forge for biometric comparison purposes, since a myriad of qualities are measured ranging from dialect and speaking style to pitch, spectral magnitudes, and format frequencies. The vibration of a user's vocal chords and the patterns created by the physical components resulting in human speech are as distinctive as fingerprints. Voice prints of two individuals can differ from each other at about one hundred (100) different points.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4A is a flowchart of a method for seamless authenticating and enrolling customers in accordance with some embodiments of the present invention;

Figure 1:
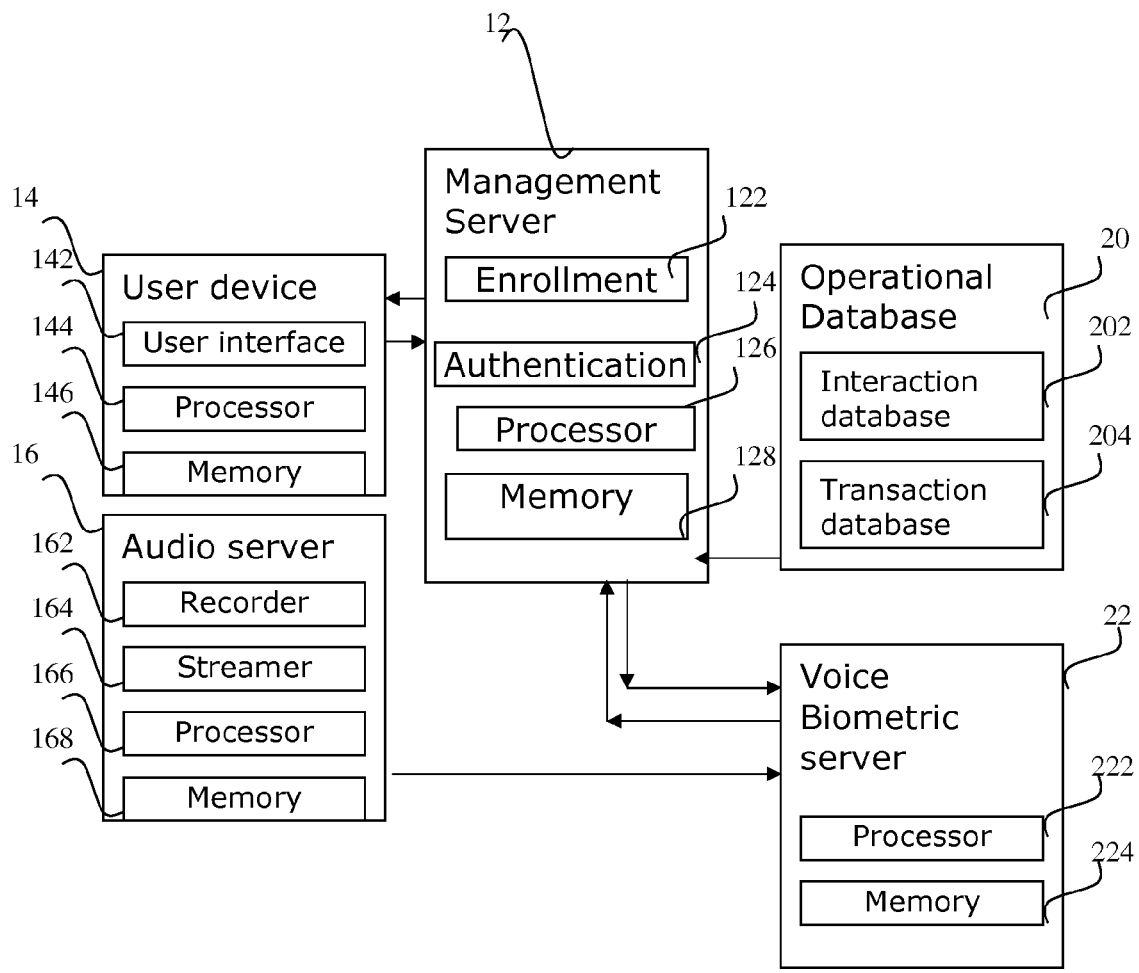
FIG. 1 is a high level block diagram of an exemplary system for authenticating and enrolling customers according to some embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Although embodiments of the invention are not limited in this regard, unless specifically stated otherwise, as apparent from the following discussions, it is appreciated that discussions utilizing terms such as, for example, "processing," "computing," "calculating," "determining," "establishing", "analyzing", "checking", "receiving", "selecting", "sending a request", "comparing", "enrolling", "reporting", "prompting", "storing" or the like, refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

When used herein, the term "communication session" may refer to any communication event between two or more parties that comprises a vocal or audio component of at least one party. For example, a communication session may include an oral communication between a customer and an agent or a communication session between a customer and an Automatic Voice Response (AVR) unit or an Integrated Voice Response (IVR) unit at a call center. The communication may be over the telephone (line or mobile), Voice Over IP (VOIP) or the like. In another example, a communication session may include a face to face interaction at a walk-in center or any other location, for example, at a bank counter, meeting with an insurance agent or at a doctor appointment. Another example for a communication session may be a video conference that includes two or more participants.

Recording a communication session may include recording any applicable information, e.g., audio and video included in the communication session. The entire recording of the communication session may be included in an audio segment. It will further be noted that although a caller will typically be referred to as a customer or client, it should be understood that the customer may be any applicable entity, e.g., a student communicating with an academic institution, a constituent communicating with a government agency, a user of a service communicating with a service provider or a call center providing services to, or acting as a front end for, a busyness, company, institution or any other applicable organization.

The recorded voice segment may include or may be divided to one or more audio streams or audio buffers, such that each of the buffers may be recorded and may further be the base for generating a voice print related to the customer. The buffers or the streams may include various portions of the audio segment, for example, the audio stream may include the entire audio segment, half of the audio segment, or any portion of the audio segment. The audio segment may be divided into buffers or stream comprising the same or different amount of audio data, having the same or different duration, etc. Several audio streams or buffers may be grouped and ordered together to reconstruct an audio segment.

Some embodiments of the invention may be related to generation of a voice print from an audio stream received or recorded during a communication session. Voice prints may be generated using any voice print generation engine known in the art such as, for example, from Nuance Communications, Inc. or Voice Biometric Group, Inc. Some embodiments may include comparing different voice prints from different origins using any voice biometric platforms known in the art, for example from Nuance Communications, Inc. or Authentify, Inc. The voice print generation engine and the voice biometric platform may be both included in a voice biometric server.

Reference is now made to FIG. 1 which is a high-level block diagram of a system for authenticating and enrolling customers in accordance with some embodiments of the present invention. At least some of the components of the authentication and enrollment system may be implemented in a call center environment. The system may include a plurality of user devices 14 (only one is shown) that may be operated by agents of a call center during, before and after engaging in a communication session with a customer, one or more audio servers 16 (only one is shown) to record communication sessions, a management server 12 configured to control the enrollment and/or authentication processes, an operational database 20 that includes data related to customers and communication sessions and a voice biometric server 22 configured to generate voice prints of the customers.

Management server 12 may receive information from user device 14 (operated, for example, by an agent of the company or the call center), from operational data base 20 and from voice biometric server 22. Voice biometric server 22 may generate voice prints from audio streams received from audio server 16. Audio server 16 and user device 14 may both be included in a call center or contact center for conducting and recording communication sessions between agents and customers. It will further be noted that although an organization operating the management server will typically be referred to as a company, it should be understood that the company may be any applicable business, institution or corporation entity, for example, a financial institution such as a bank, an online retailer or any other company, firm, business or corporation.

During a communication session between an agent and a customer, management server 12 may receive from user device 14 a request to authenticate a customer. After performing the authentication and while the communication session still proceeds, management server 12 may send a notification to the user device, informing the agent if the customer was successfully authenticated or not. Further, management server 12 may perform a passive (seamless) authentication and control enrollment of voice prints, using for example, an ongoing process.

Management server 12 may include an enrollment unit 122, which may also be referred to as an enrollment server or an enrollment manager configured to control the enrollment process of new voice prints and an authentication unit 124, which may also be referred to as an authentication server or an authentication manager to control automatic and seamless authentication of the customer during the communication session.

Management server 12 may further include at least one processor 126 and at least one memory unit 128. Processor 126 may be any computer, processor or controller configured to execute commands included in a software program, for example to execute the methods disclosed herein. Enrollment manager 122 and authentication server 124 may each include or may each be in communication with processor 126. Alternatively, a single processor 126 may perform both the authentication and enrollment methods. Processor 126 may include components such as, but not limited to, one or more central processing units (CPU) or any other suitable multi-purpose or specific processors or controllers, one or more input units, one or more output units, one or more memory units, and one or more storage units. Processor 126 may additionally include other suitable hardware components and/or software components.

Memory 128 may store codes to be executed by processor 126. Memory 128 may be in communication with or may be included in processor 126. Memory 128 may include a mass storage device, for example an optical storage device such as a CD, a DVD, or a laser disk; a magnetic storage device such as a tape, a hard disk, Storage Area Network (SAN), a Network Attached Storage (NAS), or others.

User device 14 may be operated by an agent within a contact center. For example, user device 14 may include a desktop or laptop computer in communication with the company's network. User device 14 may include a user interface 142, a processor 144 and a memory 146. User interface 142 may include any device that allows a human user to communicate with the processor. User interface 144 may include a display, a Graphical User Interface (GUI), a mouse, a keyboard, a microphone, an earphone and other devices that may allow the user to upload information to processor 144 and receive information from processor 144. Processor 144 may include or may be in communication with memory 146 that may include codes or instructions to be executed by processor 144.

As used herein "call center" or "contact center" may include any platform that enables two or more parties to conduct a communication session. For example, call center may include an agent or IVR that conducts a communication session with a customer during a call (e.g., over a telephone call or VOIP) or a video conference. Additionally or alternatively, the call center may include a place for a face to face meeting between an agent and a customer.

As used herein, an agent may be any representative or worker of the company or the institution, conducting the communication session on behalf of the company. During the communication session the agent may receive identification information from the customer, for example, the name of the customer, a customer number, an ID number and/or a social security number. Additionally or alternatively, the agent may receive identification information related to the customer automatically from details related to the "call", for example, the telephone number from which the customer calls, or the area (PIN code) from which the customer calls. The agent may use user interface 144 to upload and receive information related to the identity of the customer from database 20 via management server 12. The agent may manually authenticate the identity of the customer by asking the customer KYC questions related to data stored in database 20. For example, the agent may ask the customer to provide personal details (e.g., credit card number, and/or the name of his pet) or to describe the latest actions the customer preformed (e.g., financial transactions). During the communication session, an audio segment or an audio stream may be recorded and stored in audio server 16.

Audio server 16 may include an audio recorder 162 to record the customer's voice, an audio streamer 164 to stream the recorded voice, a processor 166 to control the recording, streaming and storing of audio stream and a memory 168 to store code to be executed by the processor. Audio recorder 162 may include any components configured to record an audio segment (a voice of a customer) of the communication session. Processor 166 may instruct audio streamer 164 to receive audio segment from recorder 162 and stream the segment into audio streams or buffers. Audio server 16 may further include, or may be in communication with, any storage unit(s) for storing the audio stream, e.g., in an audio archives, in such way that a future use of the recorded streams may be done by the company. The audio archives may include audio data (e.g., audio streams) of historical communication sessions.

Operational database 20 may include one or more databases, for example, at least one of an interaction database 202 and a transaction database 204. Interaction database 202 may store non-transactional information of customers such as home address, name, and work history related to customers of the company. Such non-transactional information may be provided to the company by the customer, e.g., when opening a bank account. Furthermore, database 202 may store interaction information related to previous communication sessions conducted by agents of the company with the customer, such as, the time and date of the session, the duration of the session, information acquired from the customer during the session (e.g., authentication information, successful/unsuccessful authentication).

Transaction database 204 may include transactional information related to previous actions preformed by the customer during his/hers interaction(s) with the company, such as, actions preformed by the customer (e.g., money transfer, account balance check, order checks books, order goods and services or get medical information). Each of databases 202 and 204 may include one or more storage units. In an exemplary embodiment, interaction database 202 may include data related to the technical aspects of the communication sessions (e.g., the time, date and duration of the session), a client relation management (CRM) database that stores personal details related to the customer or both. In some embodiments, interaction database 202 and transaction database 204 may be included in a single database. Databases 202 and 204 included in operational database 20 may include one or more mass storage devices. The storage device may be located onsite where the audio segments or some of them are captured, or in a remote location. The capturing or the storage components can serve one or more sites of a multi-site organization.

Audio or voice recordings recorded, streamed and stored in audio server 16 may be processed by voice biometric server 22. Voice biometric server 22 may include one or more processors 222 and one or more memories 224. Processor 222 may include or may control any voice biometric engine known in the art, for example, the voice biometric engine by Nuance Inc. to generate a voice print (i.e., voice biometric data) of at least one audio stream received from audio server 16. The voice print may include one or more parameters associated with the voice of the customer. Processor 222 may include or may control any platform known in the art, for example the platform by Nuance Inc. USA, for processing (e.g., identifying and comparing) voice prints generated from two or more audio streams. When an audio stream associated with a customer is being a candidate for enrollment, voice biometric server 22 may receive from management server 12 verification of the identity of the customer. Following the verification, voice biometric server 16 may generate a voice print of the audio stream related to the customer. Processor 222 may further be configured to compare the generated voice print to other voice prints previously enrolled and stored, for example, in one or more storage units associated with voice biometric server 22. The storage units associated with voice biometric server 22 may include voice prints stored at a potential fraudster list (i.e., watch list, black list, etc.), voice prints related to the customer that were enrolled following previous communication sessions with the customer, and/or voice prints related or associated with other customers. Memory 224 may include codes or instructions to be executed by processor 222. In some embodiments, memories 146, 168 or 224 may include the same elements disclosed with respect to memory 128.

Figure 2A:
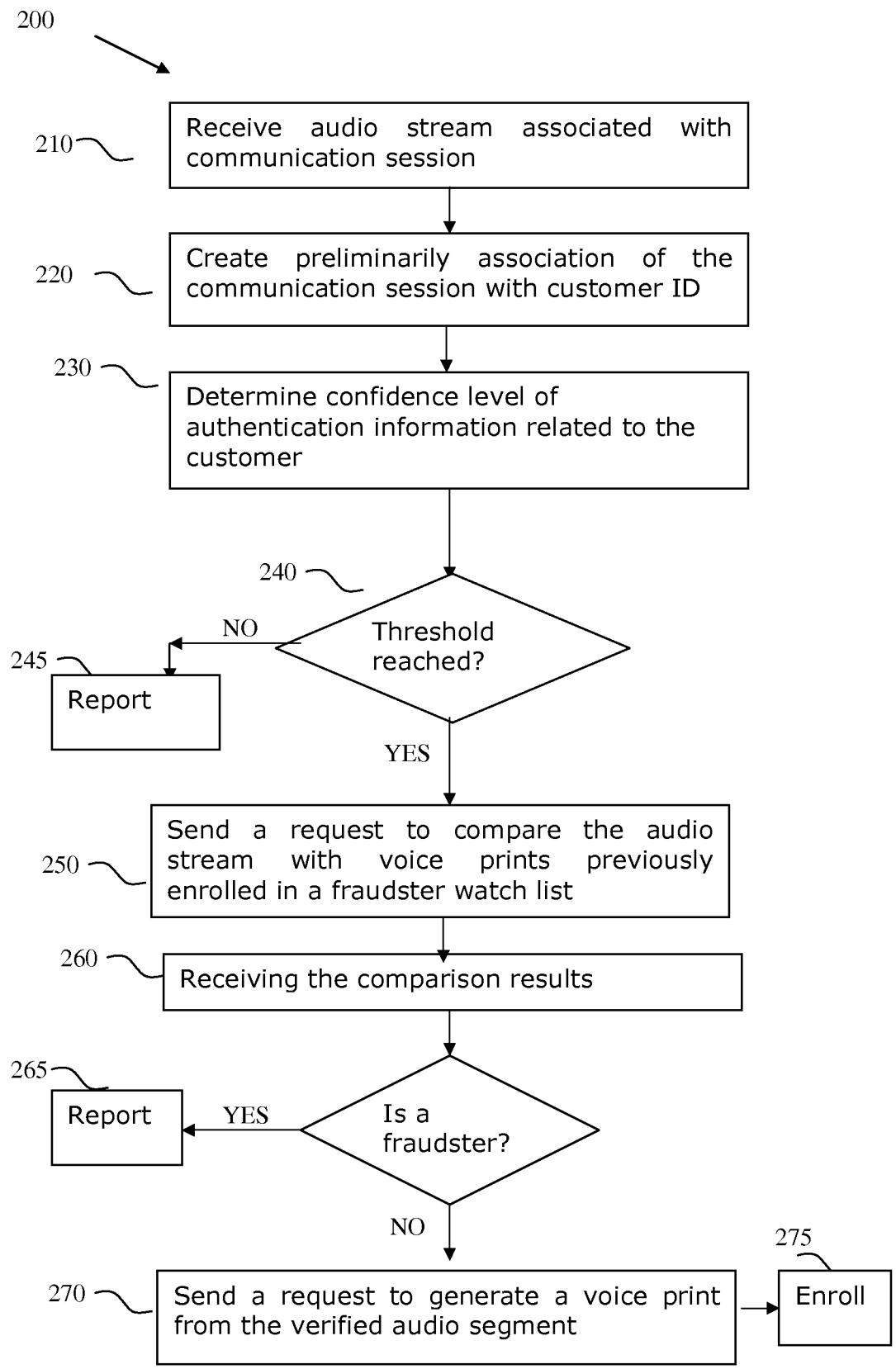
FIG. 2A is a flowchart of a method for seamless authenticating and enrolling customers according to some embodiments of the present invention.

Reference is made to FIG. 2A which shows a method for seamless authenticating and enrolling customers according to some embodiments of the invention. Method 200 described herein with reference to FIG. 2 may be executed by a processor or a controller, for example, by processor 126 of management server 12. The processor may execute instructions stored in memory 128 to perform the method disclosed herein. Other systems may perform embodiments of the invention as well. In operation 210, the method may include receiving an audio stream associated with a communication session. The communication session may be any interaction between a customer of a company and a representative (i.e., an agent or an automatic response) of the company that involves spoken communication of the customer (e.g., the customer is required to speak during the session). The audio stream may be any portion of the customer's audio data that may be received from audio server 16. The audio server may record a segment of the communication session, using audio recorder 162, stream the segment into streams or buffers using audio streamer 164 and store the streams or buffers.

In operation 220, the method may include creating a preliminary association between the audio stream and an identity of a customer that has engaged in the communication session based on identification information. The identification information may be received from operational database 20 or a database included in database 20, for example, interaction database 202, or any other database that includes identification information related to the customer and the communication session. The identification information may include for example, a name, a telephone number, an area code, a social security number, a mail address, an email address, an IP address, an identity number and/or a PIN code. In some exemplary embodiments, the audio stream may be preliminarily associated with a name of a customer, or a combination of a name and social security number that were received from the customer during the communication session. In some embodiments, the audio stream may be associated with identification information related to the communication session (e.g., the call), for example, the telephone number (e.g., conventional telephone or mobile telephone) from which the call was received, the IP address associated with a voice over IP conversation or an email address associated with the voice over IP conversation.

Operational database 20 may further include information related to the communication session, for example, authentication information received from the customer during the communication session. The authentication information may be received by an agent of the company using one or more KYC questions, at one or more communication sessions conducted with the customer. Additionally, database 20 may include or may be in communication with transaction database 204 that includes information related to transactions made by the customer (e.g., financial transaction, order of goods and/or services).

In operation 230, the method may include determining a confidence level of the preliminary association based on authentication information related to the customer. The authentication information may be stored in operational database 20 or a database included in database 20, for example, transaction database 204. The additional information may include authentication information and/or information related to transactions made by the customer. Management server 12 may use at least some the information to determine a confidence level of authentication and identification information related to the customer.

For example, the confidence level may be determined based on the number of times the customer has passed or failed answering the KYC questions, during all previous communication sessions made by the customer. In yet another example, the confidence level may be determined based on transactions or actions made by the customer during the communication session associated with the audio stream. For example, if the transaction includes actions or orders that are not typical for the identified customer (e.g., transactions of larger sums of money than the usual average for this customer), the audio stream may be suspected to belong to a fraudster. The confidence level may be calculated as a single number or a vector and a threshold level may further be determined.

In operation 240, the method may include checking if the confidence level is above the threshold. If so, the audio stream may be further processed. If the confidence level is below the threshold, the audio stream may not be used for enrollment and may be reported as suspicious (operation 245). In some cases, if the authentication level is below the threshold, the audio stream will not be used for enrollment but will not be reported as suspicious. Reporting may include creating a "black list" of possible suspicions audio streams and/or prompting to the user device that this audio stream may be suspicious. An audio stream associated with a confidence level higher than the threshold may further be processed to find if the audio stream belongs to a known fraudster. In operation 250, the method may include sending a request to compare the audio stream to a database of voice prints of known fraudsters. The request may be sent by management server 12 to voice biometric server 22 to generate a temporary voice print from the audio stream, using any voice biometric engine known in the art, and than compare various parameters related to the generated voice print with the same parameters at voice prints stored in the fraudster watch list.

In operation 260, management server 12 may receive from voice biometric server 22 the comparison results. If the comparison or the matching yields that the audio stream belongs to a known fraudster, a report is issued for further assessment (operation 265). For example, the report may include a notification to contact the actual customer associated with the identified information. The customer may be advised to change the KYC authentication information stored at the operational database (e.g., database 20). If a match to a known fraudster is not found, the method may further include, sending a request to generate from the audio stream a voice print associated with the customer (operation 270).

In operation 275, the method may include enrolling the voice print of the customer. For example, voice biometric server may include a voice print database to store all the enrolled voice prints associated with customers of the company. The voice print database may include lookup tables that include, for example, voice prints associated with names of customers, sorted alphabetically, or voice prints associated with ID numbers related to the customers sorted by numerical order. The enrolled voice prints may be stored for future use, for example, in the automatic authentication process, that will be discussed with respect to FIG. 5.

Figure 2B:
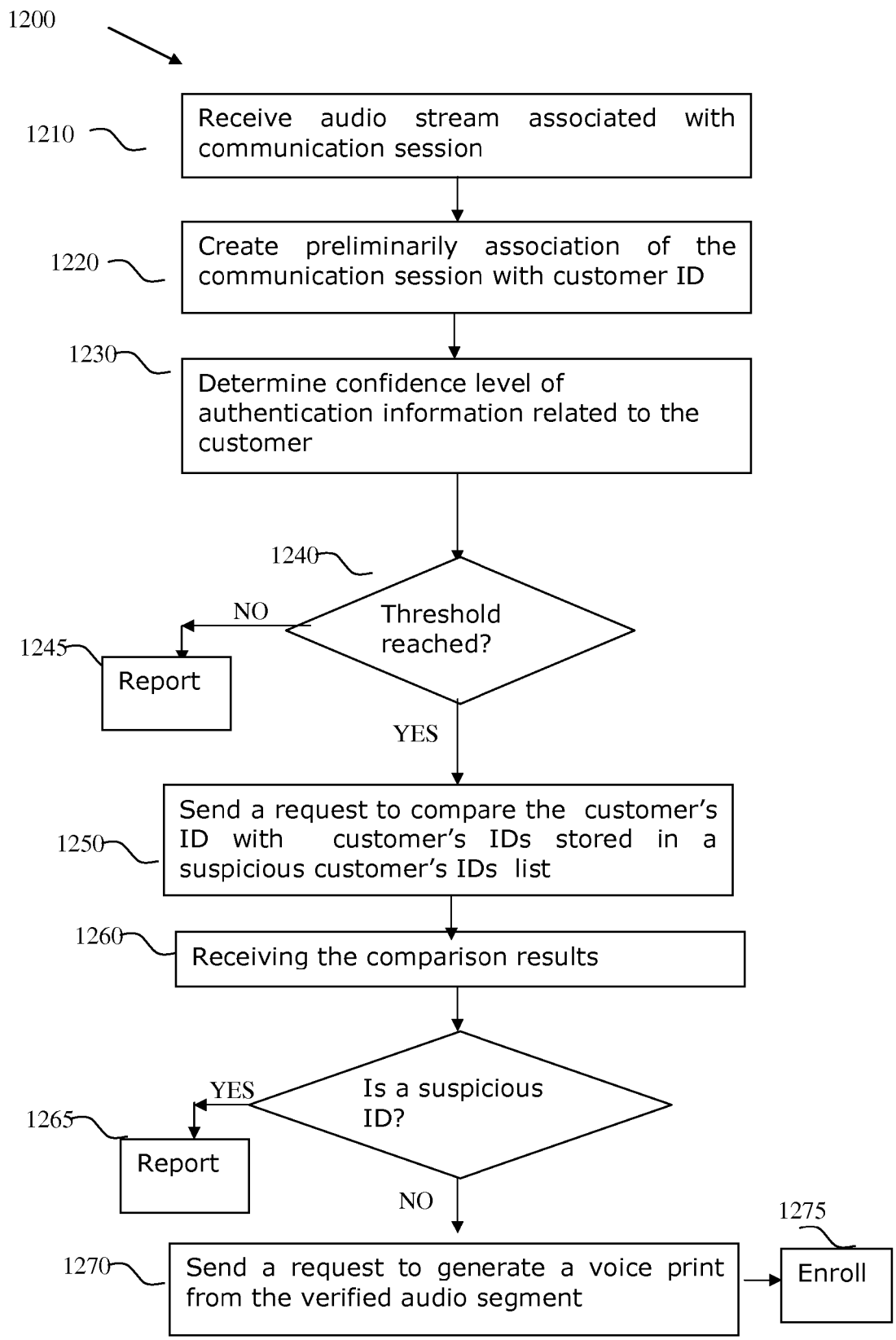
FIG. 2B is a flowchart of a method for seamless authenticating and enrolling customers according to some embodiments of the present invention.

Reference is made to FIG. 2B which is an illustration of a method for authenticating and enrolling customers in accordance with some embodiments of the present invention. Method 1200 described herein may be executed by processor 126 of management server 12. The processor may execute instructions stored in memory 128 to perform the method disclosed herein. Other systems may perform embodiments of the invention as well. Method 1200 includes operations 1210-1245 that are substantially identical to operations 210-245 discussed above with respect to method 200 and therefore these operations will not be further described.

In operation 1240, the method may include checking if the confidence level is above the threshold. If so, in operation 1250, the method may include sending a request to compare identification information (ID) related to the customer received during the communication session with identification information stored in a suspicious customer identification information list. The suspicious customer identification information list may be stored in one of the company's databases, for example, in operational database 20 and/or in any other database associated with management server 12.

In operation 1260, the method may include receiving the comparison results. If the customer identification information matches any identification information stored in the suspicious customer identification information list, the method may include sending a report that indicates that a customer using suspicious identification information is/was trying to conduct a communication session (in operation 1265). Any audio stream recorded during this communication session may not be further used.

If the comparison yields that the identification information related to the customer does not match any of the identification information stored in the suspicious customers identification information list, the method may include sending a request to generate a voice print from the verified audio stream and enrolling the voice print associated with the identification information (operation 1270).

Figure 3:
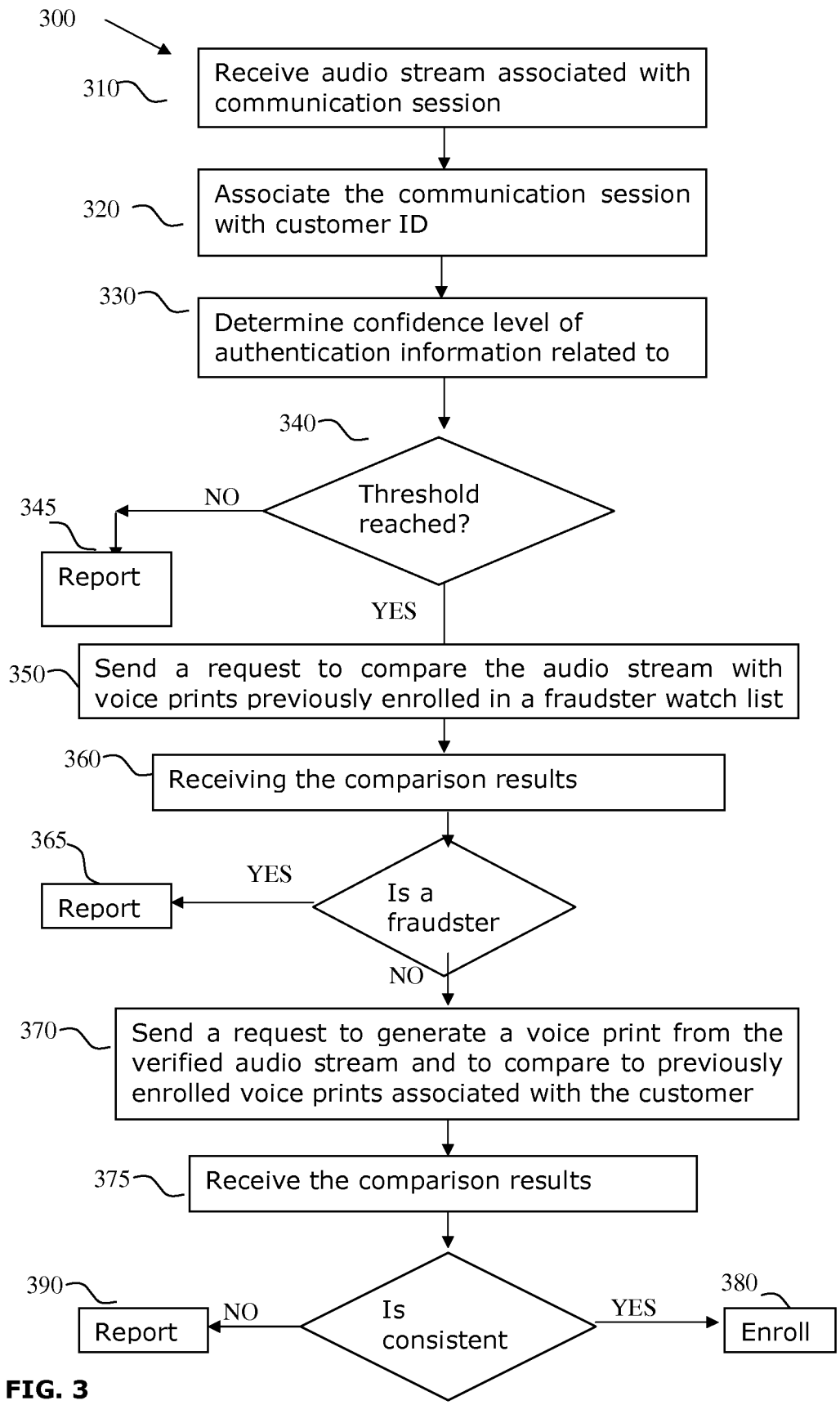
FIG. 3 is a flowchart of a method for seamless authenticating and enrolling customers according to some embodiments of the present invention.

Reference is made to FIG. 3 which is an illustration of a method for authenticating and enrolling customers in accordance with some embodiments of the present invention. Method 300 described herein may be executed by processor 126 of management server 12. The processor may execute instructions stored in memory 128 to perform the method disclosed herein. Other systems may perform embodiments of the invention as well. Method 300 includes operations 310-365 that are substantially identical to operations 210-265 discussed above with respect to method 200 and therefore these operations will not be further described.

After determining that the audio stream does not match any known fraudster, in operation 370, the method may include, determining if one or more previously enrolled voice prints are associated with the customer. For example, management server 12 may send a request to processor 222 included in voice biometric server 22, to determine if for the identified customer, previously enrolled voice prints are saved in the voice biometric server, and if so, to compare the voice print previously enrolled with the generated voice print. Voice biometric server 22 may utilize any voice biometric engine known in the art, to generate the voice print and later may utilize any voice biometric platform to compare the generated voice print to the previously enrolled voice print(s).

In operation 375, method 300 may further include receiving the comparison results from the voice biometric server. If the newly generated voice print is consistent with the previously enrolled voice prints, for example, all voice prints have approximately the same format frequencies, a request to enroll the current (generated) voice print may be sent (in operation 380). If the comparison indicates that there is inconsistency with the enrolled voice prints associated with the identity of the customer, a report may be made, in operation 390, that the generated voice print does not match the previously enrolled voice print associated with the customer.

For example, when the voice print may be suspected as being related to a fraudster, not included in the known fraudster watch list and a decision may be made to include the newly generated voice print in the fraudster watch list, based on the comparison and optionally additional data, for example, data related to the communication session from which the audio stream used for generating the voice print was taken. A method 600 for enrolling a fraudster in a fraudster watch list is disclosed below with respect to FIG. 6.

Reference is made to FIG. 4 illustrating a method for authenticating and enrolling customers, in accordance with some embodiments of the present invention. The method may be executed by processor 126 of management server 12. The processor may execute instructions stored in memory 128 to perform the method disclosed herein. Other systems may perform embodiments of the invention as well. Method 400 includes operations 410-465 that are substantially identical to operations 210-265 discussed above with respect to method 200 and therefore these operations will not be further described After determining that the audio stream does not match any known fraudster, in operation 470, the method may include a request to generate a voice print from the verified audio stream using any voice biometric engine. In operation 474, the method may include a request for comparing the generated voice print associated with the customer to voice prints associated with other customers. The comparison may be done using any voice biometric platform known in the art. The previously enrolled voice prints associated with other customers may be stored in a storage unit associated with voice biometric server 22. In operation 476, the method may further include receiving the result of the comparison.

In some embodiments, the method may include storing the temporary generated voice print in a temporary storage unit ("quarantine") for a predetermined period of time. The temporary generated voice print may be stored, for a period of time, in a database either included in voice biometric sever 22 or excluded from server 22, for example, in a storage unit included in operational database 20. The temporally stored voice print may be compared during the period of time with other voice prints associated with other customers that are temporarily stored for similar or different periods of time.

The comparison results are checked and if the current voice print does not match any other voice prints associated with any of the other customers, the method may include enrolling the generated voice print (operation 480). The current voice print may be saved in a storage unit associated with voice biometric server 22. If, however, a match is found between the generated voice print and any voice print related to another customer of the company, the method may include reporting that both voice prints are suspicious and may belong to a potential fraudster (operation 490).

Following operation 490, further investigation may be made comprising additional information, for example, information stored at operational database 20.

Figure 4B:
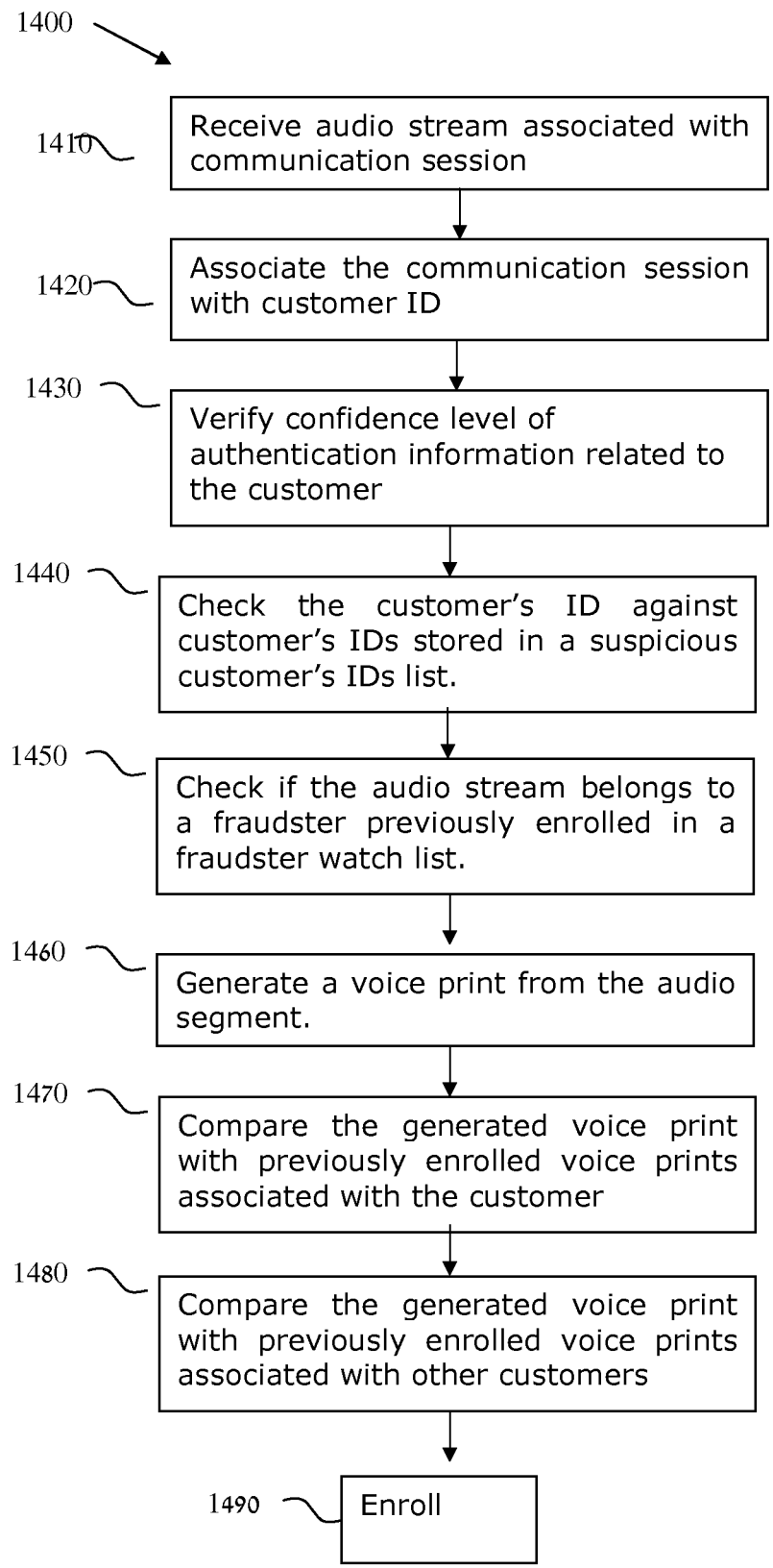
FIG. 4B is a flowchart of a method for seamless authenticating and enrolling customers in accordance with some embodiments of the present invention.

Reference is made to FIG. 4B which is an illustration of a method for authenticating and enrolling customers in accordance with some embodiments of the present invention. Method 1400 described herein may be executed by processor 126 of management server 12. The processor may execute instructions stored in memory 128 to perform the method disclosed herein. Other systems may perform embodiments of the invention as well. Method 1400 includes operations 1410-1420 that are substantially identical to operations 210-220 discussed above with respect to method 200 and therefore these operations will not be further described.

In operation 1430, the method may include verifying the confidence level of the authentication information related to the customer. The authentication information may be stored in operational database 20 or a database included in database 20, for example, transaction database 204. The authentication information may include information related to the customer (e.g., previous successful or unsuccessful manual authentication processes) and/or information related to transactions made by the customer. Management server 12 may use at least some this information to determine a confidence level of the authentication information related to the customer and later to verify if the confidence level is higher than a threshold. If the confidence level is higher than the threshold, the method may further include in operation 1440, checking the customer's identification information, received during the communication session, against customer's identification information stored in a suspicious customer's list. The suspicious customer identification information list may be stored in one of the company's databases, for example, in operational database 20 and/or in any other database associated with management server 12.

If the customer's identification information was not listed in the suspicious customer's identification information list, the method may include in operation 1450, checking if the audio stream belongs to a fraudster previously enrolled in a fraudster watch list. A request may be sent by management server 12 to voice biometric server 22 to generate a temporary voice print from the audio stream, using any voice biometric engine known in the art, and than compare various parameters related to the generated voice print with the same parameters at voice prints stored in the fraudster watch list. If the audio stream does not belong to a fraudster, the method may include in operation 1460, sending a request to generate a voice print from the audio stream. The voice print may be generated using any voice biometric engine.

In operation 1470, the method may include comparing the generated voice print with previously enrolled voice prints associated with the customer. Management server 12 may send a request to processor 222 included in voice biometric server 22, to determine if for the identified customer, previously enrolled voice prints are saved in the voice biometric server, and if so, to compare the voice print previously enrolled with the generated voice print. Voice biometric server 22 may utilize any voice biometric platform to compare the generated voice print to the previously enrolled voice print(s). If the comparison yields that the generated voice print does match previously enrolled voice prints associated with the customer, the method may further include in operation 1480, comparing the generated voice print with previously enrolled voice prints associated with other customers. Management server 12 may order voice biometric server 22 to compare the generated voice print to voice prints associated with other customers, stored for example in a database associated with voice biometric server 22 or in any other data based related to the company, for example, operational database 20. If no match is found between the generated voice print and any other voice print associated with another customer, the method may include in operation 1490, enrolling the generated voice print. The generated voice print may be enroller and save in a database associated with the voice biometric server or in any other database used by the company for storing generated voice prints.

In some embodiments, the decision whether to enroll a voice print generated from an audio stream may include some or all of the various operations included in methods 200, 1200, 300, 400 and 1400 in any combination. The various operations included in methods 200, 1200, 300, 400 and 1400 do not have to be preformed in the exact order as disclosed above and can be at any combination and any order that may lead to a decision if to enroll a voice print or not.

In some embodiments, additional criterion or criteria may be included in the decision whether to enroll a voice print generated from an audio stream. For example, the criteria may include a decision to enroll only premium customers (e.g., VIP customers) that the company would like to supply to those premium customers a better service. In yet another example, the criteria may include enrolling only customers that already gave consent (either orally or in writing) to record their voices and enroll the recorded voices for future use. A method 700 for receiving consent of a customer is disclosed with respect to FIG. 7.

Additional criteria may be included in earlier stages in methods 200, 1200, 300 and 400, just after receiving the audio stream. The criteria may be related to the quality of the audio stream, and may include a decision not to enroll an audio stream having audio quality lower than a threshold. There may be several effects that may harm an audio recording, for example, background noises, poor recording due to destruction in the communication line (or wireless), etc. Audio server 16 may include a threshold level for the quality of the recording, and methods 200, 1200, 300 and 400 may be applied only to audio streams having a recording quality higher than the threshold.

Figure 5:
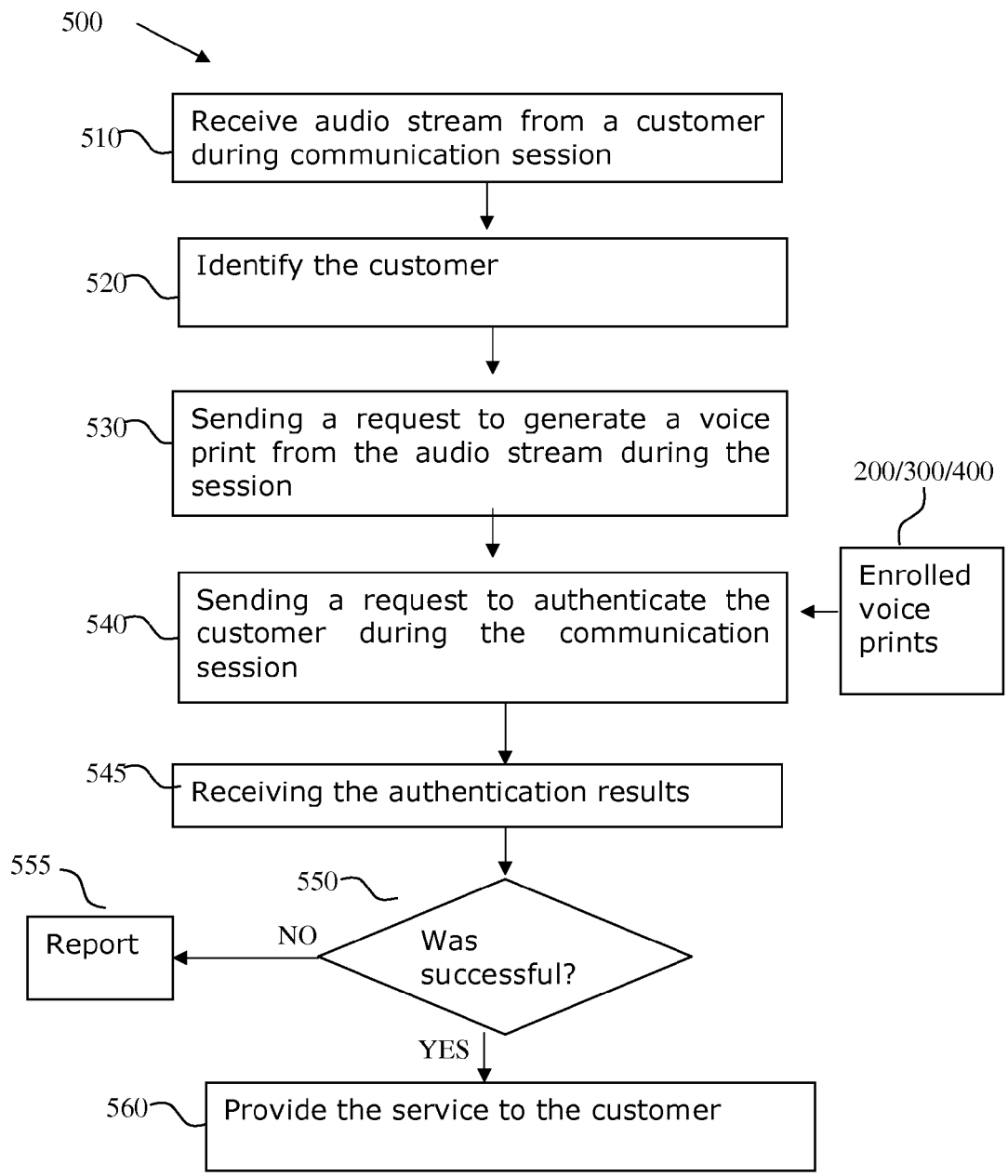
FIG. 5. is a flowchart of a method for automatic authentication of a customer according to some embodiments of the invention.

Reference is made to FIG. 5 that illustrates a method for automatically authenticating a customer during a communication session according to some embodiments of the invention. A method 500 may be executed by processor 126 of management server 12. The processor may execute instructions stored in memory 128 to perform the method disclosed herein. Other systems may perform embodiments of the invention as well. During a communication session between a customer of a company and an agent representing the company, it may be required to identify and authenticate the identification of the customer, in order for example, for the agent to supply to the customer a service requested by the customer, e.g., acquisition of good or services, performing monetary transactions, receiving medical information or medical consultation. In operation 510, the method may include receiving an audio stream from the customer during a succeeding communication session. The audio stream may include any segment or portion of a spoken communication that may take place between the customer of the company and the agent representing the company. The succeeding communication session may be a telephone conversation, voice over IP conversation, a video conference, a face to face meeting, or the like. During the succeeding communication session, audio server 16 may record the audio segment of the voice of the customer and stream the segment to receive at least one audio stream of the customer engaged in the succeeding communication session.

In operation 520, the method may include receiving the identity of the customer during the succeeding communication session. For example, the agent (or AVR) may identify the customer by requesting identification information that may include, for example, at least one of: a name, an ID number, a social security number, a password and/or a personal code. The agent, if human may upload the customer's identification information to processor 146 using user interface 142 and processor 146 may later supply the identification information to management server 12 (e.g., to authentication server 124 included in server 12).

Additionally or alternatively, the identity of the customer may be automatically received, for example, management server 12 may automatically identify a telephone number from which the customer calls or an IP address related to a voice over IP communication, that were previously associated with the customer. The automatic identification information may be acquired by the agent during previous communication sessions, for example, a telephone number may be associated with a customer that was manually identified by a human agent in the first or second communications (e.g., when opening a bank account) done by the customer.

In operation 530, the method may include sending a request, for example, to voice biometric server 22, to generate during the succeeding communication session, a voice print related to the customer. The generation of the voice print, may be preformed during the spoken communication included in the succeeding communication session, in a seamless way, such that the customer is unaware that his voice is being recorded and that a voice print has being generated. The entire operation should be very quick and short, for example, in the order of 1 second, 0.5 second, 0.2 second or less.

In operation 540, the method may include sending a request to authenticate the customer during the succeeding communication session. In order to have the automatic authentication of the identity of the person, a request may be sent from management server 12 to voice biometric server 22 to compare the generated voice print of the customer with previously enrolled voice print(s) associated with the identity of the customer. The comparison may be done using any voice biometric platform, included in voice biometric server 22. The previously enrolled voice print(s) may be enrolled in a database (in a storage unit(s)) associated or included in voice biometric server 22, or in any other storage unit accessible for any processor of the company, using any one of methods 200, 1200, 300 or 400, or a combination thereof, according to some embodiments of the invention. In operation 545, the method may include receiving information related to the authentication of the identity of the customer during the succeeding communication session.

If the authentication, in operation 550, yields that the generated voice print matches previously enrolled voice print associated with the identity of the customer, the automatic authentication of the customer may be successful. Management server 12 may prompt user device 14 that the customer has been successfully identified and the agent may continue and provide to the customer the required service (in operation 560). Management server 12 may prompt to the agent using user interface 142. For example, management server 12 may sent a written massage that can popup on a display included in user interface 142 and/or send an oral massage (e.g., a recorded massage "the user has been identified") to an earphone(s) included in user interface 142. For AVR, upon receiving the automatic authentication, the system (e.g., any computer system of the company) may continue and supply to the customer the requested service, for example, an automatic acquisition of goods.

If the automatic authentication fails, (the customer may not be whom he/she claims to be), management server 12 may report (e.g., to the agent (using any one of the methods disclosed above) that the authentication has been failed (operation 555). The agent may then decide or may be required to make a further investigation regarding the identity of the customer. There may be several reasons for a failure in automatic authentication of a voice print when the customer is whom he/she claims to be. For example, bad recording of the voice print, background noise and/or destructions in the communication lines (or wireless line). In this case the agent may be required to perform a manual authentication of the customer using, for example, KYC questions or question related to historical actions taken by the customer. In this case, the agent may be a human agent, and in the case that the system includes an AVR, management server 12 may forward the communication session (e.g., that call) to a human agent for further investigation. If both automatic and manual authentications failed, management server 12 may send a request to voice biometric server 16 to save the generated voice print in a potential fraudster list.

Figure 6:
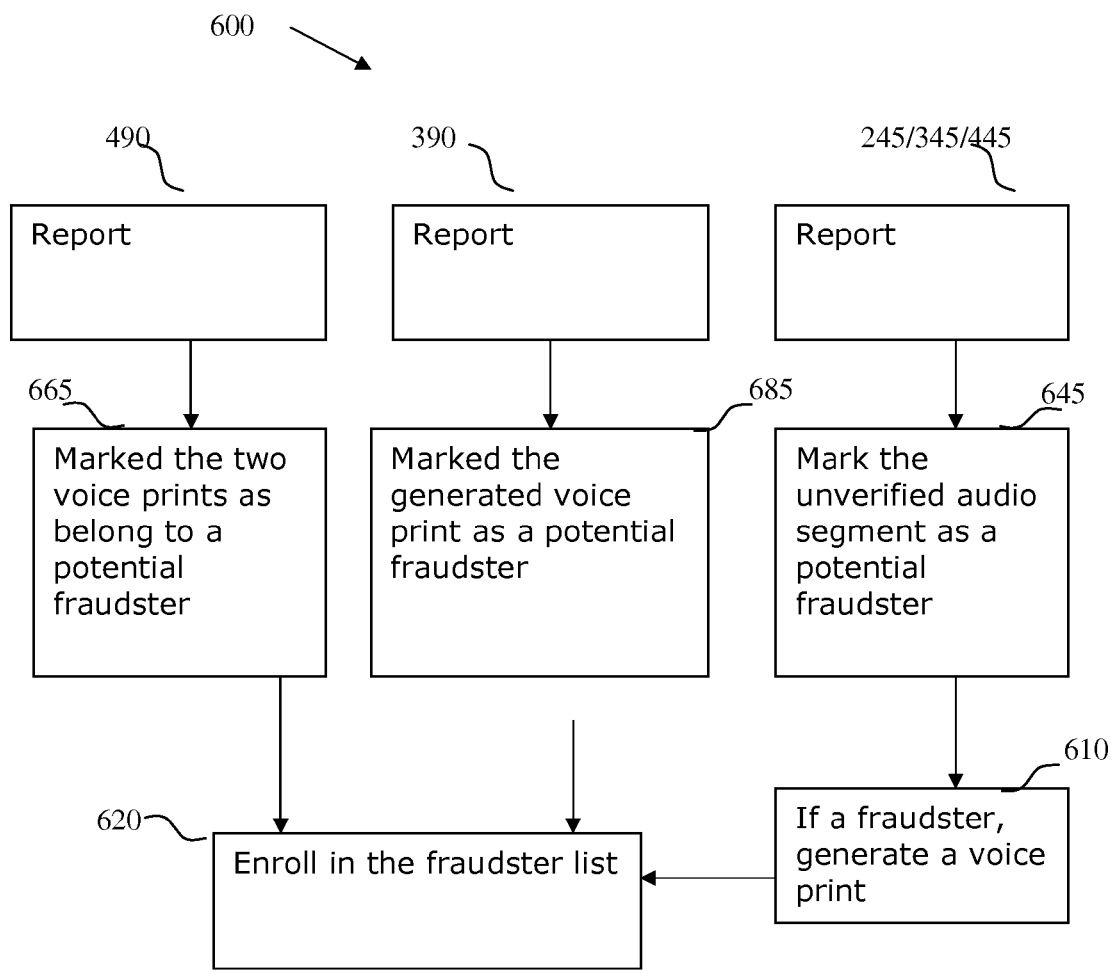
FIG. 6 is a flowchart of a method for enrolling a fraudster in a fraudsters watch list according to some embodiments of the invention.

Reference is now made to FIG. 6, which illustrates a method for enrolling fraudsters in a fraudsters watch list, according to some embodiments of the invention. Method 600 may be executed by processor 126 of management server 12. The processor may execute instructions stored in memory 128 to perform the method disclosed herein. Other systems may perform embodiments of the invention as well. Management server 12 may determine that a particular audio segment may be related to a fraudster, not yet enrolled in the known fraudster's watch list in several scenarios.

During the seamless authentication process included in operations 230, 1230, 330 and 430 in methods 200, 1230, 300 and 400, if the confidence level of the authentication data is lower than the threshold, the audio stream may be suspected as belong to a fraudster. The report made in operation 245, 1245, 345 and 445, may include the confidence level, if the confidence level is much lower than the threshold (e.g., by at least 50%), the audio stream may be marked as "unverified audio stream", in operation 645, and may be sent for a further analysis, comprising, for example, a human or a machine analysis of the content of the communication session (what have been said by the customer during that session? what actions the customer wanted to perform? etc.).

If the human or machine analysis shows that the audio stream belongs to a fraudster, management server 12 may send a request to voice biometric server 22 to generate a voice print (operation 610) using any voice biometric engine and enroll the voice print in the known fraudster list (operation 620).

In some embodiments, when inconsistency is found between a voice print generated from the audio segment and previously enrolled voice print(s) associated with the customer, the report ((for example the report of operation 390 included in method 300) may include an indication that the new audio stream is not related to the identified customer. After verifying that the failure is not due to a poor quality of the audio stream, operation 685 may include marking the voice print as belonging to a potential fraudster, and optionally conducting an investigation. If the investigation results with the conclusion that the voice print belongs to a fraudster, management server 12 may send a request to voice biometric server 22, to enroll the voice print as a fraudster in the kwon fraudster list (operation 620).

In some embodiments, when a generated voice print associated with the customer may be found as a match to another voice print(s) associated with another customer, both the generated voice print and the voice print(s) associated with the other customer may be reported (for example in operation 490 included in method 400) as being suspicious. Operation 665 may include marking the two matched voice prints as belonging to a single person, and optionally conducting an investigation either by a human agent or by a machine regarding information related to the two communication sessions that are associated with each of the voice prints. For example, a recording of the content of each communication session may be analyzed possibly to identify other similarities between the two communication sessions (e.g., similar actions or information were requested, or the like). If the analysis yields that the voice prints are related to a fraudster, management server 12 may instruct voice biometric server 22 to store at least one of the voice prints (or a combination of the voice prints) in the known fraudster list (operation 620).

In some embodiments, a potential fraudster may be identified during the communication session (e.g., in real time) for example, due to a failure in an automatic authentication (for example operation 540 of method 500). Management server 12 may instruct the agent (e.g., a human agent) to conduct an investigation and analysis of the potential fraudster, for example, using at least some of the information related to the customer that may be stored in operational database 20 or at other databases (e.g., CRM) that are related to the company and includes information related to the customer. For example, in addition to the KYC questions, the agent may investigate the client regarding historical actions made by the client and the time those actions were made, for example, a banker may ask a client of a bank: when was the last time he/she ordered a checkbook? a doctor may ask a patient, what was the last prescription he received from the doctor?, etc. If the investigation yields that the person engaging in communication session is a fraudster and not the customer, management server 12 may instruct voice biometric server 22 to enroll the voice print previously generated (for example, in operation 530 of method 500) in the known fraudster list.

Figure 7:
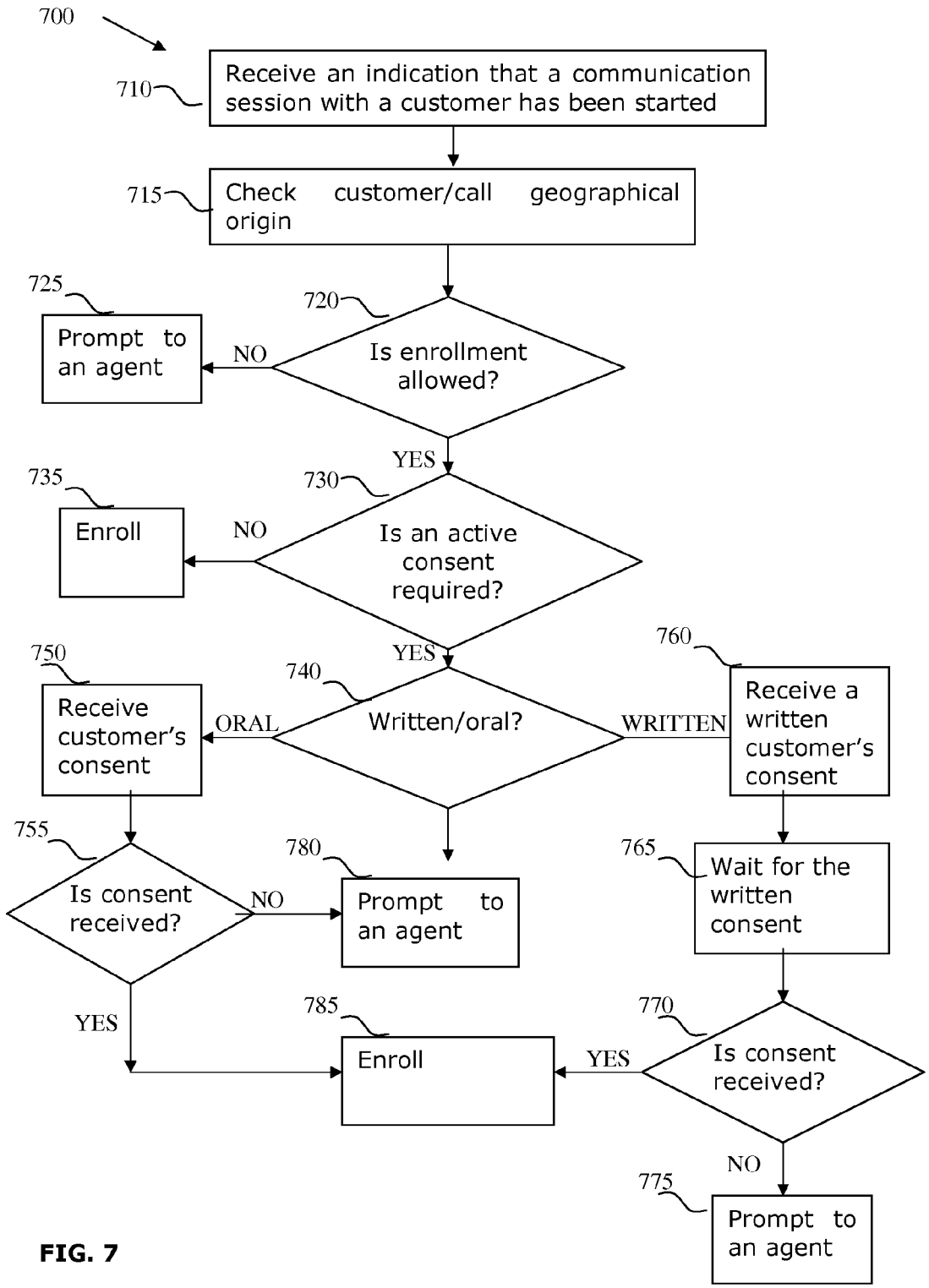
FIG. 7 is a flowchart of a method for receiving consent for enrolling a voice segment according to some embodiments of the invention.

Reference is made to FIG. 7, which illustrates a method for receiving consent from a customer of the company to record and further use a voice stream of the customer according to some embodiments of the invention. Method 700 may be executed by processor 126 of management server 12. The processor may execute instructions stored in memory 128 to perform the method disclosed herein. Other systems may perform embodiments of the invention as well.

In various jurisdictions, consent must be received from a person to record voice for future use by a company, for example to enroll a voice print generated from a recorded voice and use the voice print for automatic authentication of the customer. In some jurisdictions, a passive consent may be enough. A passive consent, as used herein, is a consent given by the customer when he/she agrees to continue the communication session after hearing a disclaimer announcement that the communication session may be recorded for future use by the company. However, in other jurisdictions, an active consent must be made by the customer, for the company to be able to record the voice of the customer and use the recording. An active consent, as used herein, is a consent given by the customer following a direct request from an agent (or AVR) to give consent. The consent may be given orally or may be given in writing, either as a hard copy on a paper or on using any electronic media, such as, a facsimile, an email message, an SMS massage, via an Internet chat etc.

In operation 710, the method may include receiving an indication that a communication session with a customer has been started between a customer and an agent (or AVR) of the company, for example, in a call center. The communication session may be any communication session according to any embodiment of the invention disclosed above. A controller or processor, either included in the call center (e.g., processor 144) or included in an external server (e.g., processor 126 included in management server 12) may check the origin of the communication session (operation 715). For example, determining from where geographically the call is received by tracking the communication transportation, or check the origin of the customer, e.g., where the customer lives according to data related to the customer stored, for example, in operational database 20.

Some jurisdictions may not allow to record and enroll any voice print related to a customer. In operation 720, the method includes identifying the origin of the telephone call based for example on calling number and checking if enrollment of voice prints is allowed in the area associated with the calling number, namely in the area from which the telephone call has been originated. If enrollment is not allowed according to the law and the regulations in that jurisdiction, the system may prompt to the agent and the communication session will not be recorded (operation 725).

If the law and regulations in the area from which the telephone call has been originated allows enrollment, the method may include identifying if an active consent is required or not (operation 730). If an active consent in not required, the system may announce or play to the customer a declaimer announcement that his voice may be recorded for future use by the company, and an automatic enrollment and an automatic authentication may be performed, for example, according to methods 200, 1200, 300, 400 and 500 (operation 735). If an active consent is required, the method may include identifying the type of consent (oral or written) required according to laws and the regulations related to the geographical origin of the communication session and/or the customer (operation 740).

If an oral consent is sufficient according to the local law related to the origin of the communication session and/or the customer, the agent (or AVR) may ask for the customer consent and the consent may be received for example by management server 12 (operation 750). If the consent is received in operation 755, an audio stream of the voice of the customer may be taken and a voice print may be generated and enrolled according to embodiments of the invention (operation 785). If the consent is not received in operation 755, the system may prompt to an agent (operation 780) so that the agent approach the customer. If no consent is given, a comment associated with the identity of the customer may be recorded that this customer's voice should not be recorded. Additional comments may be stored to periodically ask for this customer's consent, for example, once a year.

If a written consent is required, the agent may be guided to ask the customer to send a written consent to the company and the written consent may be received operation and saved in the company database (operation 760). The agent may send the customer forms to be filled and signed by the customer. The agent may send the forms using for example, an email message or a facsimile message. In operation 765, the method may include determining a predefined defined period of time, for example, one week to wait prior to prompting an agent to approach the customer and request the written consent. The written consent may be given using any method that is expectable by the company's legal advisors, for example, by a mail, an email message and/or a facsimile message.

In operation 770, the method may include checking if the consent was received. If the consent was received, the method may include sending an alert that a voice print of the customer should be taken and enrolled in the next communication session the customer may conduct with any agent of the company (operation 785). The enrollment may be done using, for example any of methods 200, 1200, 300 and 400. If the written consent was not received during the period of time, the method may include prompting to the agent to send a reminder to the customer or to find if the customer is at all interested in the service (operation 775). If a written denial is received the method may include adding a comment, such as "not to record any voice segment of that customer" in the customer database. The method may include adding a comment to periodically try to verify the denial or receive consent from the customer, for example, once a year.

The following are some examples for Simple Object Access Protocol (SOAP) that may be used in some of the methods included in the present invention.

Example 1 is a Simple Object Access Protocol that matches voice prints against other voice prints previously stored, for example, in a fraudster's watch list.

```
POST /SPID/SPIDServer.asmx HTTP/1.1
Host: spid
Content-Type: application/soap+xml; charset=utf-8
Content-Length: length
<?xml version="1.0" encoding="utf-8"?>
<soap12:Envelope xmlns:xsi="http://www.w3.org/2001/XMLSchema-instance"
xmlns:xsd="http://www.w3.org/2001/XMLSchema"
xmlns:soap12="http://www.w3.org/2003/05/soap-envelope">
    <soap12:Body>
        <Identify xmlns="http://www.nuance.com/webservices/">
            <sessionId>long</sessionId>
            <groupId>string</groupId>
            <voiceprintTag>string</voiceprintTag>
            <audio>string</audio>
            <configSetName>string</configSetName>
        </Identify>
    </soap12:Body>
</soap12:Envelope>
HTTP/1.1 200 OK
Content-Type: application/soap+xml; charset=utf-8
Content-Length: length
<?xml version="1.0" encoding="utf-8"?>
<soap12:Envelope xmlns:xsi="http://www.w3.org/2001/XMLSchema-instance"
xmlns:xsd="http://www.w3.org/2001/XMLSchema"
xmlns:soap12="http://www.w3.org/2003/05/soap-envelope">
    <soap12:Body>
        <IdentifyResponse xmlns="http://www.nuance.com/webservices/">
            <IdentifyResult>
                <Decision>NotSet or Mismatch or Inconclusive or Match or Failure</Decision>
                <DecisionReason>VoiceprintMatch or VoiceprintMismatch or VoiceprintInconclusive or VoiceprintPartialMatch or AudioTooShort or AudioTooLong or WrongPassphrase or PlaybackIndication or InternalError or AudioTooSoft or AudioTooLoud or AudioTooNoisy or MultiSpeakersDetected or FraudsterIndication or InvalidAudio or ToneDetected</DecisionReason>
                <SpeakerId>string</SpeakerId>
                <WatchListSuspect>string</WatchListSuspect>
                <NetAudio>float</NetAudio>
                <SpeakerResults>
                    <SpeakerResult>
                        <SpeakerId>string</SpeakerId>
                        <VoiceprintTag>string</VoiceprintTag>
                        <InWatchList>boolean</InWatchList>
                        <Decision>NotSet or Mismatch or Inconclusive or Match or Failure</Decision>
                        <DecisionReason>VoiceprintMatch or VoiceprintMismatch or VoiceprintInconclusive or VoiceprintPartialMatch or AudioTooShort or AudioTooLong or WrongPassphrase or PlaybackIndication or InternalError or AudioTooSoft or AudioTooLoud or AudioTooNoisy or MultiSpeakersDetected or FraudsterIndication or InvalidAudio or ToneDetected</DecisionReason>
                        <BiometricFlag>boolean</BiometricFlag>
                        <BiometricDecision>NotSet or Mismatch or Inconclusive or Match or Failure</BiometricDecision>
                        <BiometricScore>int</BiometricScore>
                        <BiometricUpperThreshold>int</BiometricUpperThreshold>
                        <BiometricLowerThreshold>int</BiometricLowerThreshold>
                        <PlaybackFlag>boolean</PlaybackFlag>
                        <PlaybackDecision>Original or Playback</PlaybackDecision>
                        <PlaybackScore>int</PlaybackScore>
                        <PlaybackThreshold>int</PlaybackThreshold>
                        <TextFlag>boolean</TextFlag>
                        <TextDecision>NotSet or Mismatch or Inconclusive or Match or Failure</TextDecision>
                        <TextScore>int</TextScore>
                        <TextUpperThreshold>int</TextUpperThreshold>
                        <TextLowerThreshold>int</TextLowerThreshold>
                        <WatchListFlag>boolean</WatchListFlag>
                        <WatchListDecision>NotSet or Mismatch or Inconclusive or Match or Failure</WatchListDecision>
                        <WatchListFDScore>int</WatchListFDScore>
                        <WatchListFDUpperThreshold>int</WatchListFDUpperThreshold>
                        <WatchListFDLowerThreshold>int</WatchListFDLowerThreshold>
                    </SpeakerResult>
                    <SpeakerResult>
                        <SpeakerId>string</SpeakerId>
                        <VoiceprintTag>string</VoiceprintTag>
                        <InWatchList>boolean</InWatchList>
                        <Decision>NotSet or Mismatch or Inconclusive or Match or Failure</Decision>
                        <DecisionReason>VoiceprintMatch or VoiceprintMismatch or VoiceprintInconclusive or VoiceprintPartialMatch or AudioTooShort or AudioTooLong or WrongPassphrase or PlaybackIndication or InternalError or AudioTooSoft or AudioTooLoud or AudioTooNoisy or MultiSpeakersDetected or FraudsterIndication or InvalidAudio or ToneDetected</DecisionReason>
                        <BiometricFlag>boolean</BiometricFlag>
                        <BiometricDecision>NotSet or Mismatch or Inconclusive or Match or Failure</BiometricDecision>
                        <BiometricScore>int</BiometricScore>
                        <BiometricUpperThreshold>int</BiometricUpperThreshold>
                        <BiometricLowerThreshold>int</BiometricLowerThreshold>
                        <PlaybackFlag>boolean</PlaybackFlag>
                        <PlaybackDecision>Original or Playback</PlaybackDecision>
                        <PlaybackScore>int</PlaybackScore>
                        <PlaybackThreshold>int</PlaybackThreshold>
                        <TextFlag>boolean</TextFlag>
                        <TextDecision>NotSet or Mismatch or Inconclusive or Match or Failure</TextDecision>
                        <TextScore>int</TextScore>
                        <TextUpperThreshold>int</TextUpperThreshold>
                        <TextLowerThreshold>int</TextLowerThreshold>
                        <WatchListFlag>boolean</WatchListFlag>
                        <WatchListDecision>NotSet or Mismatch or Inconclusive or Match or Failure</WatchListDecision>
                        <WatchListFDScore>int</WatchListFDScore>
                        <WatchListFDUpperThreshold>int</WatchListFDUpperThreshold>
                        <WatchListFDLowerThreshold>int</WatchListFDLowerThreshold>
                    </SpeakerResult>
                </SpeakerResults>
            </IdentifyResult>
        </IdentifyResponse>
    </soap12:Body>
</soap12:Envelope>
```

Example 2 is a Simple Object Access Protocol that checks the consistency of voice prints against other voice prints previously stored for the same identified customer.

```
POST /SPID/SPIDServer.asmx HTTP/1.1
Host: spid
Content-Type: application/soap+xml; charset=utf-8
Content-Length: length
<?xml version="1.0" encoding="utf-8"?>
<soap12:Envelope xmlns:xsi="http://www.w3.org/2001/XMLSchema-
instance"
xmlns:xsd="http://www.w3.org/2001/XMLSchema"
xmlns:soap12="http://www.w3.org/2003/05/soap-envelope">
    <soap12:Body>
        <Enroll xmlns="http://www.nuance.com/webservices/">
            <sessionId>long</sessionId>
            <speakerId>string</speakerId>
            <voiceprintTag>string</voiceprintTag>
            <audio>string</audio>
            <configSetName>string</configSetName>
        </Enroll>
    </soap12:Body>
</soap12:Envelope>
HTTP/1.1 200 OK
Content-Type: application/soap+xml; charset=utf-8
Content-Length: length
<?xml version="1.0" encoding="utf-8"?>
<soap12:Envelope xmlns:xsi="http://www.w3.org/2001/XMLSchema-
instance"
xmlns:xsd="http://www.w3.org/2001/XMLSchema"
xmlns:soap12="http://www.w3.org/2003/05/soap-envelope">
    <soap12:Body>
        <EnrollResponse xmlns="http://www.nuance.com/webservices/">
            <EnrollResult>NotReady or Ready or Trained or TrainFailed or
Full or UnAuthorized</EnrollResult>
        </EnrollResponse>
    </soap12:Body>
</soap12:Envelope>
```

Example 3 is a Simple Object Access Protocol that automatically authenticate a customer, by checking if a given audio stream match any an identified customer.

```
POST /SPID/SPIDServer.asmx HTTP/1.1
Host: spid
Content-Type: application/soap+xml; charset=utf-8
Content-Length: length
<?xml version="1.0" encoding="utf-8"?>
<soap12:Envelope xmlns:xsi="http://www.w3.org/2001/XMLSchema-
instance"
xmlns:xsd="http://www.w3.org/2001/XMLSchema"
xmlns:soap12="http://www.w3.org/2003/05/soap-envelope">
    <soap12:Body>
        <Verify xmlns="http://www.nuance.com/webservices/">
            <sessionId>long</sessionId>
            <speakerId>string</speakerId>
            <voiceprintTag>string</voiceprintTag>
            <audio>string</audio>
            <configSetName>string</configSetName>
        </Verify>
    </soap12:Body>
</soap12:Envelope>
HTTP/1.1 200 OK
Content-Type: application/soap+xml; charset=utf-8
Content-Length: length
<?xml version="1.0" encoding="utf-8"?>
<soap12:Envelope xmlns:xsi="http://www.w3.org/2001/XMLSchema-
instance"
xmlns:xsd="http://www.w3.org/2001/XMLSchema"
xmlns:soap12="http://www.w3.org/2003/05/soap-envelope">
    <soap12:Body>
        <VerifyResponse xmlns="http://www.nuance.com/webservices/">
            <VerifyResult>
                <Decision>NotSet or Mismatch or Inconclusive or Match or
Failure</Decision>
                <DecisionReason>VoiceprintMatch or VoiceprintMismatch or
VoiceprintInconclusive or VoiceprintPartialMatch or AudioTooShort or
AudioTooLong or WrongPassphrase or PlaybackIndication or InternalError
or AudioTooSoft or AudioTooLoud or AudioTooNoisy or
MultiSpeakersDetected or FraudsterIndication or InvalidAudio or
ToneDetected</DecisionReason>
                <SpeakerId>string</SpeakerId>
                <WatchListSuspect>string</WatchListSuspect>
                <NetAudio>float</NetAudio>
                <SpeakerResults>
                    <SpeakerResult>
                        <SpeakerId>string</SpeakerId>
                        <VoiceprintTag>string</VoiceprintTag>
                        <InWatchList>boolean</InWatchList>
                        <Decision>NotSet or Mismatch or Inconclusive or Match or
Failure</Decision>
                        <DecisionReason>VoiceprintMatch or VoiceprintMismatch
or
VoiceprintInconclusive or VoiceprintPartialMatch or AudioTooShort or
AudioTooLong or WrongPassphrase or PlaybackIndication or InternalError
or AudioTooSoft or AudioTooLoud or AudioTooNoisy or
MultiSpeakersDetected or FraudsterIndication or InvalidAudio or
ToneDetected</DecisionReason>
                        <BiometricFlag>boolean</BiometricFlag>
                        <BiometricDecision>NotSet or Mismatch or Inconclusive or
Match or Failure</BiometricDecision>
                        <BiometricScore>int</BiometricScore>
                        <BiometricUpperThreshold>int</BiometricUpperThreshold>
                        <BiometricLowerThreshold>int</BiometricLowerThreshold>
                        <PlaybackFlag>boolean</PlaybackFlag>
                        <PlaybackDecision>Original or Playback
</PlaybackDecision>
                        <PlaybackScore>int</PlaybackScore>
                        <PlaybackThreshold>int</PlaybackThreshold>
                        <TextFlag>boolean</TextFlag>
                        <TextDecision>NotSet or Mismatch or Inconclusive or
Match
or Failure</TextDecision>
                        <TextScore>int</TextScore>
                        <TextUpperThreshold>int</TextUpperThreshold>
                        <TextLowerThreshold>int</TextLowerThreshold>
                        <WatchListFlag>boolean</WatchListFlag>
                        <WatchListDecision>NotSet or Mismatch or Inconclusive or
Match or Failure</WatchListDecision>
                        <WatchListFDScore>int</WatchListFDScore>
                        <WatchListFDUpperThreshold>int
</WatchListFDUpperThreshold>
                        <WatchListFDLowerThreshold>int
</WatchListFDLowerThreshold>
                    </SpeakerResult>
                    <SpeakerResult>
                        <SpeakerId>string</SpeakerId>
                        <VoiceprintTag>string</VoiceprintTag>
                        <InWatchList>boolean</InWatchList>
                        <Decision>NotSet or Mismatch or Inconclusive or Match or
Failure</Decision>
                        <DecisionReason>VoiceprintMatch or VoiceprintMismatch
or
VoiceprintInconclusive or VoiceprintPartialMatch or AudioTooShort or
AudioTooLong or WrongPassphrase or PlaybackIndication or InternalError
or AudioTooSoft or AudioTooLoud or AudioTooNoisy or
MultiSpeakersDetected or FraudsterIndication or InvalidAudio or
ToneDetected</DecisionReason>
                        <BiometricFlag>boolean</BiometricFlag>
                        <BiometricDecision>NotSet or Mismatch or Inconclusive or
Match or Failure</BiometricDecision>
                        <BiometricScore>int</BiometricScore>
                        <BiometricUpperThreshold>int</BiometricUpperThreshold>
                        <BiometricLowerThreshold>int</BiometricLowerThreshold>
                        <PlaybackFlag>boolean</PlaybackFlag>
                        <PlaybackDecision>Original or Playback
</PlaybackDecision>
                        <PlaybackScore>int</PlaybackScore>
                        <PlaybackThreshold>int</PlaybackThreshold>
                        <TextFlag>boolean</TextFlag>
                        <TextDecision>NotSet or Mismatch or Inconclusive or
Match
or Failure</TextDecision>
                        <TextScore>int</TextScore>
                        <TextUpperThreshold>int</TextUpperThreshold>
                        <TextLowerThreshold>int</TextLowerThreshold>
```

-continued

```
        <WatchListFlag>boolean</WatchListFlag>
        <WatchListDecision>NotSet or Mismatch or Inconclusive or
Match or Failure</WatchListDecision>
            <WatchListFDScore>int</WatchListFDScore>
            <WatchListFDUpperThreshold>int
            </WatchListFDUpperThreshold>
            <WatchListFDLowerThreshold>int
            </WatchListFDLowerThreshold>
        </SpeakerResult>
      </SpeakerResults>
    </VerifyResult>
  </VerifyResponse>
 </soap12:Body>
</soap12:Envelope>
```

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A computer-implemented method comprising:
receiving audio streams from an audio server that archives audio data of historical communication sessions between customers and representatives;
for each of at least some of the audio streams generating and enrolling a respective enrolled voice print by:
a management server using a processor to create a preliminary association between an audio stream related to a particular one of the historical communication sessions and an identity of a customer that has engaged in the particular historical communication session based on stored identification information;
determining using the processor a confidence level of the preliminary association based on stored authentication information related to the customer;
if the confidence level is higher than a threshold, checking using the processor the identity of the customer against a suspicious customer list, and if the identity of the customer is not listed in the suspicious customer identification information list, sending a request to compare the audio stream to a database of voice prints of known fraudsters;
if the audio stream does not match any known fraudsters, sending a request to generate from the audio stream a current voice print associated with the customer;
prior to enrolling the current voice print, comparing using the processor the current voice print associated with the customer to a voice print previously enrolled for the customer and comparing using the processor the current voice print associated with the customer to voice prints associated with other customers; and
enrolling using the processor the current voice print, if the current voice print does not match any other voice prints associated with any of the other customers and if the current voice print is consistent with the voice print previously enrolled for the customer, in a customer voice print database as an enrolled voice print;
if the current voice print does match a voice print associated with another customer reporting using the processor the current voice print as suspicious and reporting the voice print associated with the other customer as suspicious;
and
automatically authenticating the customer during a succeeding communication session based on the enrolled voice print.

2. The method of claim 1, further comprising:
prior to enrolling the current voice print, storing the current voice print associated with the customer for a period of time; and
comparing the current voice print to voice prints associated with other customers that were enrolled during the period of time.

3. The method of claim 1, wherein the confidence level is determined based on data provided by the customer during at least one historical communication session.

4. The method of claim 1, wherein the stored authentication information includes parameters related to at least one of: knowledge based information and secret pass key.

5. The method of claim 1, wherein the stored authentication information includes parameters related to historical actions performed by the customer.

6. The method of claim 1, wherein authenticating the customer based on the enrolled voice print during the succeeding communication session with the customer comprises:
receiving an audio stream related to the succeeding communication session during the succeeding communication session;
receiving the identity of the customer during the succeeding communication session;
seamlessly generating a new voice print during the succeeding communication session without the awareness of the customer;
seamlessly sending a request for authentication of the identity of the customer, during the succeeding communication session based on the enrolled voice print stored in the customer voice print database and the new voice print; and
receiving information related to the authentication of the identity of the customer during the succeeding communication session.

7. The method of claim 1, comprising:
during the succeeding communication session, identifying if customer consent for recording audio data and enrolling a new voice print is required;
if so, receiving the customer consent to record the communication session; and
recording the communication session.

8. The method of claim 7, wherein receiving the consent is related to at least one of: geographical origin of the communication session or the geographical origin of customer.

9. The method of claim 1, further comprising for at least one of the audio streams, determining not to enroll a respective voice print based on a status of the customer.

10. The method of claim 1, further comprising for at least one of the audio streams, determining not to enroll a respective voice print based on the quality of the audio stream.

11. The method of claim 1, comprising:
if the confidence level is lower than a threshold, not using the audio stream for enrolling a voice print and reporting the voice stream as suspicious; and
if the confidence level is lower than a threshold by a certain percentage generating a voice print and enrolling the generated voice print in the database of voice prints of known fraudsters.

12. The method of claim 1, comprising determining the geographic origin of the communication sessions and determining if enrollment of voice prints is allowed in the geographic origin.

13. The method of claim 1, comprising determining if active consent for enrollment of voice prints is required for the customer whose identity is associated with the audio stream.

14. The method of claim 1, comprising, if active consent for voiceprint enrollment is required, receiving consent for enrollment of voice prints before enrolling a current voice print.

15. An apparatus comprising:
at least one processor configured to:
receive audio streams from an audio server that archives audio data of historical communication sessions between customers and representatives;
for each of at least some of the audio streams generate and enroll a respective enrolled voice print by:
creating a preliminary association between an audio stream related to a particular one of the historical communication sessions and an identity of a customer that has engaged in the particular historical communication session based on stored identification information;
determining a confidence level of the preliminary association based on stored authentication information related to the customer;
if the confidence level is higher than a threshold, checking the identity of the customer against a suspicious customer list, and if the identity of the customer is not listed in the suspicious customer identification information list, sending a request to compare the audio stream to a database of voice prints of known fraudsters;
if the audio stream does not match any known fraudsters, sending a request to generate from the audio stream a current voice print associated with the customer;
prior to enrolling the current voice print, comparing the current voice print associated with the customer to a voice print previously enrolled for the customer and comparing the current voice print associated with the customer to voice prints associated with other customers; and
enrolling the current voice print, if the current voice print does not match any other voice prints associated with any of the other customers, in a customer voice print database as an enrolled voice print;
if the current voice print does match a voice print associated with another customer reporting the current voice print as suspicious and reporting the voice print associated with the other customer as suspicious;
and
automatically authenticate the customer during a succeeding communication session based on the enrolled voice print.

16. The apparatus of claim 15, further comprising an audio server for producing the audio stream.

17. The apparatus of claim 15, further comprising at least one database for storing at least one of: the identification information and the authentication information.

18. The apparatus of claim 15, wherein the processor is further configured to:
compare the current voice print associated with the customer to voice prints associated with other customers;
if the current voice print does not match any other voice prints associated with any of the other customers, enroll the current voice print.

19. An article comprising a non-transitory computer-readable storage medium, having instructions stored thereon that when executed by at least one processor, cause the at least one processor to:
receive audio streams from an audio server that archives audio data of historical communication sessions between customers and representatives;
for each of at least some of the audio streams generate and enroll a respective enrolled voice print by:
creating a preliminary association between an audio stream related to a particular one of the historical communication sessions and an identity of a customer that has engaged in the particular historical communication session based on stored identification information;
determining a confidence level of the preliminary association based on stored authentication information related to the customer;
if the confidence level is higher than a threshold, checking the identity of the customer against a suspicious customer list, and if the identity of the customer is not listed in the suspicious customer identification information list, sending a request to compare the audio stream to a database of voice prints of known fraudsters;
if the audio stream does not match any known fraudsters, sending a request to generate from the audio stream a current voice print associated with the customer; and
prior to enrolling the current voice print, comparing the current voice print associated with the customer to a voice print previously enrolled for the customer and comparing the current voice print associated with the customer to voice prints associated with other customers;
enrolling the current voice print, if the current voice print does not match any other voice prints associated with any of the other customers and if the current voice print is consistent with the voice print previously enrolled for the customer, in a customer voice print database as an enrolled voice print;
if the current voice print does match a voice print associated with another customer reporting the current voice print as suspicious and reporting the voice print associated with the other customer as suspicious; and automatically authenticate the customer during a succeeding communication session based on the enrolled voice print.

* * * * *